(12) United States Patent
Bellanger et al.

(10) Patent No.: US 9,409,650 B2
(45) Date of Patent: Aug. 9, 2016

(54) THRUST REVERSER SUPPORTING STRUCTURE INCLUDING COMPOSITE REINFORCEMENTS AND A BASE HAVING AN UNCLOSED CROSS SECTION

(75) Inventors: Alexandre Bellanger, Le Havre (FR); Florent Bouillon, Anglesqueville l'Esneval (FR); Laurent Dubois, Le Havre (FR)

(73) Assignee: AIRCELLE, Gonfreville L'Orcher ( * ) Notice: Subject to any disclaimer, the term of this patent is extended or adjusted under 35 U.S.C. 154(b) by 823 days.

(21) Appl. No.: 13/516,759

(22) PCT Filed: Dec. 9, 2010

(86) PCT No.: PCT/FR2010/052655
§ 371 (c)(1),
(2), (4) Date: Jun. 18, 2012

(87) PCT Pub. No.: WO2011/073551
PCT Pub. Date: Jun. 23, 2011

(65) Prior Publication Data
US 2012/0248284 A1    Oct. 4, 2012

(30) Foreign Application Priority Data
Dec. 18, 2009   (FR) .................................. 09 06159

(51) Int. Cl.
*B64D 29/06* (2006.01)
*F02K 1/72* (2006.01)
*B64D 27/18* (2006.01)

(52) U.S. Cl.
CPC . *B64D 29/06* (2013.01); *F02K 1/72* (2013.01); *B64D 27/18* (2013.01); *F05D 2260/30* (2013.01); *F05D 2300/603* (2013.01); *F05D 2300/702* (2013.01); *Y02T 50/672* (2013.01)

(58) Field of Classification Search
CPC .......... B64D 27/18; B64D 29/06; F02K 1/72; F05D 2300/603; F05D 2300/702
USPC ............................ 60/226.2, 796, 798; 244/54
See application file for complete search history.

(56) References Cited

U.S. PATENT DOCUMENTS 3,599,432 A * 8/1971 Ellis .............................. 60/226.1
5,239,822 A * 8/1993 Buchacher ................... 60/226.2
(Continued)

FOREIGN PATENT DOCUMENTS

EP    0894715 A2   2/1999
FR    2926605 A1   7/2009
(Continued)

OTHER PUBLICATIONS

International Search Report issued Mar. 18, 2011 by European Patent Office re: PCT/FR2010/052655.

*Primary Examiner* — Phutthiwat Wongwian
*Assistant Examiner* — Eric Linderman
(74) *Attorney, Agent, or Firm* — Burris Law, PLLC (57) ABSTRACT

An aircraft nacelle includes: a thrust reverse device having movable cowls, and a supporting structure to support the thrust reverser device. The supporting structure includes: a base body extending along a longitudinal direction of the nacelle and made from a composite material, and a wall of the base body forming an unclosed cross section having an open portion to provide access to an inner surface of the supporting structure from outside, and a plurality of reinforcements which is made from a composite material, and attached on the inner surface along the longitudinal direction. In particular, the reinforcements are integrated in the inner surface of the supporting structure.

12 Claims, 7 Drawing Sheets

(56) References Cited

U.S. PATENT DOCUMENTS

| | | | |
|---|---|---|---|
| 5,910,094 A * | 6/1999 | Kraft | B64D 29/00 277/419 |
| 5,915,651 A * | 6/1999 | Asaki et al. | 244/110 B |
| 6,095,456 A * | 8/2000 | Powell | 244/54 |
| 6,126,110 A * | 10/2000 | Seaquist et al. | 244/54 |
| 6,129,311 A * | 10/2000 | Welch | B29C 70/342 239/265.31 |
| 6,179,249 B1 * | 1/2001 | Canadas | 244/53 R |
| 6,256,980 B1 * | 7/2001 | Lecordix et al. | 60/226.2 |
| 6,340,135 B1 * | 1/2002 | Barton | 244/53 B |
| 6,385,964 B2 * | 5/2002 | Jean et al. | 60/226.2 |
| 6,824,101 B2 * | 11/2004 | Sternberger | F02K 1/72 239/265.19 |
| 7,104,306 B2 * | 9/2006 | Huggins et al. | 164/47 |
| 7,484,356 B1 * | 2/2009 | Lair | 60/226.2 |
| 8,302,907 B2 * | 11/2012 | Welch | B23P 15/00 244/110 B |
| 8,402,765 B2 * | 3/2013 | Amkraut et al. | 60/771 |
| 8,474,750 B2 * | 7/2013 | Marche et al. | 244/54 |
| 8,511,973 B2 * | 8/2013 | Ramlaoui et al. | 415/144 |
| 8,727,275 B2 * | 5/2014 | Aten et al. | 244/110 B |
| 8,814,080 B2 * | 8/2014 | Dumont et al. | 244/54 |
| 8,875,486 B2 * | 11/2014 | Roberts | 60/226.2 |
| 9,168,716 B2 * | 10/2015 | Benedetti | B32B 15/01 |
| 9,188,026 B2 * | 11/2015 | Calder | B64D 29/06 |
| 2003/0024236 A1 * | 2/2003 | Lymons | F02K 1/72 60/226.2 |
| 2004/0035098 A1 * | 2/2004 | El Hamel et al. | 60/224 |
| 2004/0035653 A1 | 2/2004 | Christensen | |
| 2005/0082423 A1 * | 4/2005 | Whitmer et al. | 244/54 |
| 2007/0108341 A1 * | 5/2007 | Diochon et al. | 244/54 |
| 2007/0205324 A1 * | 9/2007 | Diochon et al. | 244/54 |
| 2007/0294996 A1 * | 12/2007 | Stephan et al. | 60/226.2 |
| 2008/0191088 A1 * | 8/2008 | Diochon et al. | 244/54 |
| 2008/0217502 A1 * | 9/2008 | Lafont | 248/554 |
| 2008/0251634 A1 * | 10/2008 | Bernardi et al. | 244/54 |
| 2008/0302083 A1 * | 12/2008 | Sloan et al. | 60/226.1 |
| 2008/0315033 A1 * | 12/2008 | Diochon et al. | 244/54 |
| 2009/0212155 A1 * | 8/2009 | Huggins et al. | 244/54 |
| 2009/0314887 A1 * | 12/2009 | Aten et al. | 244/110 B |
| 2010/0001123 A1 * | 1/2010 | Hillereau et al. | 244/54 |
| 2010/0040466 A1 * | 2/2010 | Vauchel et al. | 415/213.1 |
| 2011/0062279 A1 * | 3/2011 | Welch et al. | 244/54 |
| 2011/0121132 A1 * | 5/2011 | Crook et al. | 244/54 |
| 2011/0290935 A1 * | 12/2011 | Machado et al. | 244/54 |
| 2012/0104162 A1 * | 5/2012 | West | 244/54 |

FOREIGN PATENT DOCUMENTS

| | | | | |
|---|---|---|---|---|
| FR | WO 2009106763 A2 * | 9/2009 | | F02K 1/72 |
| RU | 2 136 934 C1 | 9/1999 | | |
| WO | 2007/147193 A1 | 12/2007 | | |

* cited by examiner

Prior Art

Fig. 13
Prior Art

THRUST REVERSER SUPPORTING STRUCTURE INCLUDING COMPOSITE REINFORCEMENTS AND A BASE HAVING AN UNCLOSED CROSS SECTION

TECHNICAL FIELD

The present invention relates to a supporting structure for a thrust reverser, in particular having cascades.

BRIEF DISCUSSION OF RELATED ART

Figure 11:
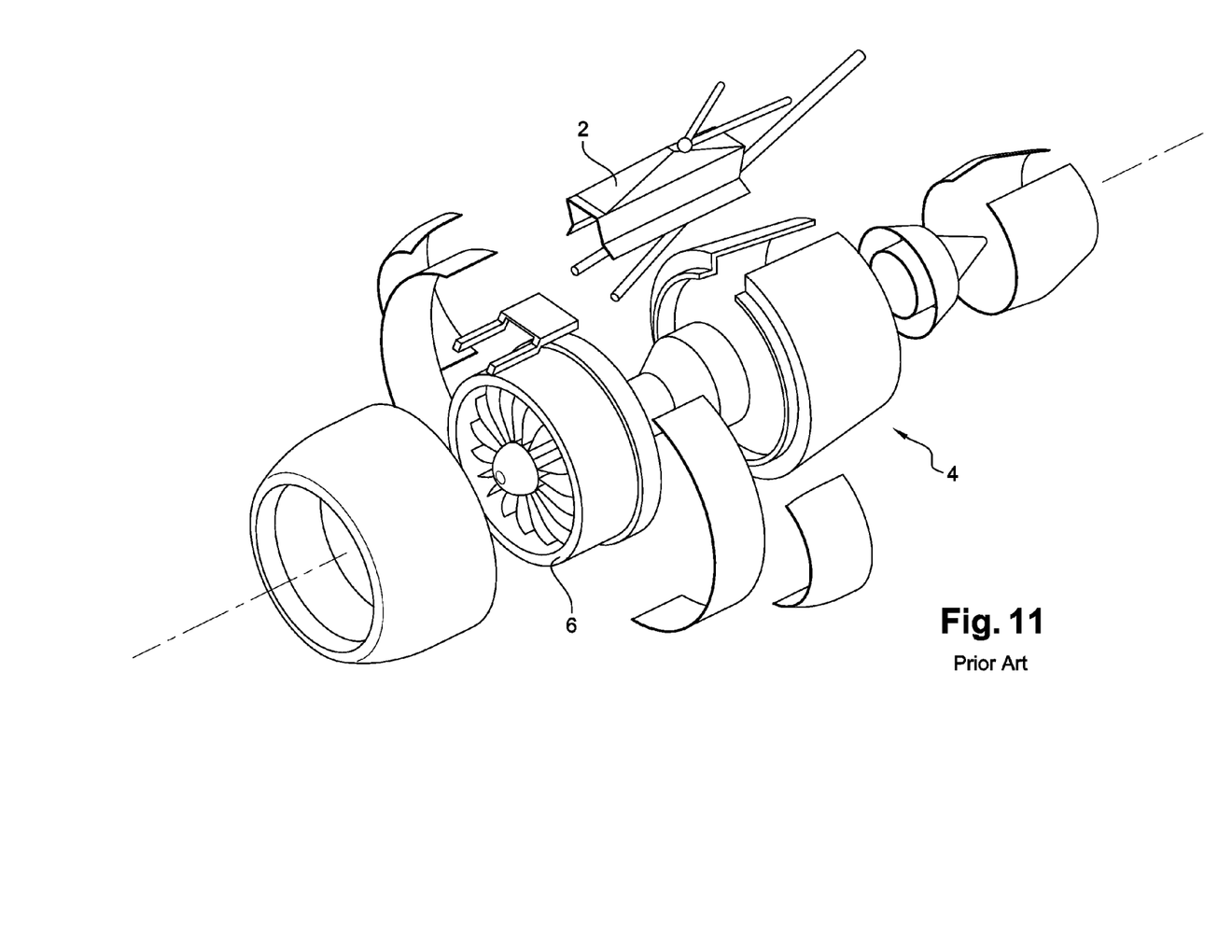
FIG. 11 is a perspective view of an engine nacelle in according to a prior art.
Figure 12:
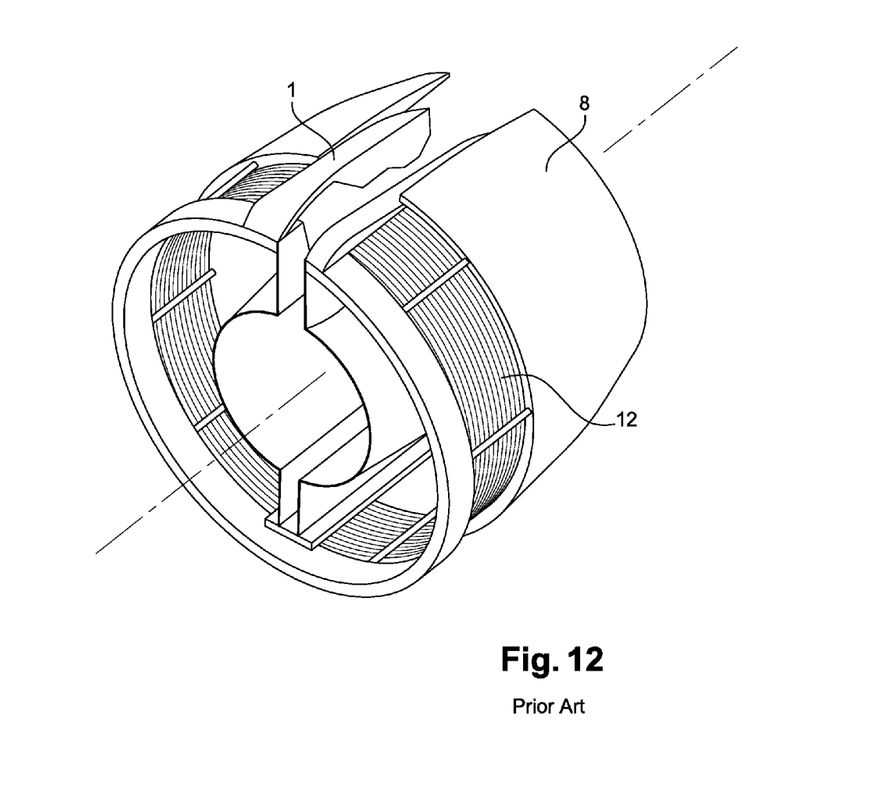
FIG. 12 is a perspective view of a thrust reverser structure in a thrust reverser position according to a prior art.
Figure 13:
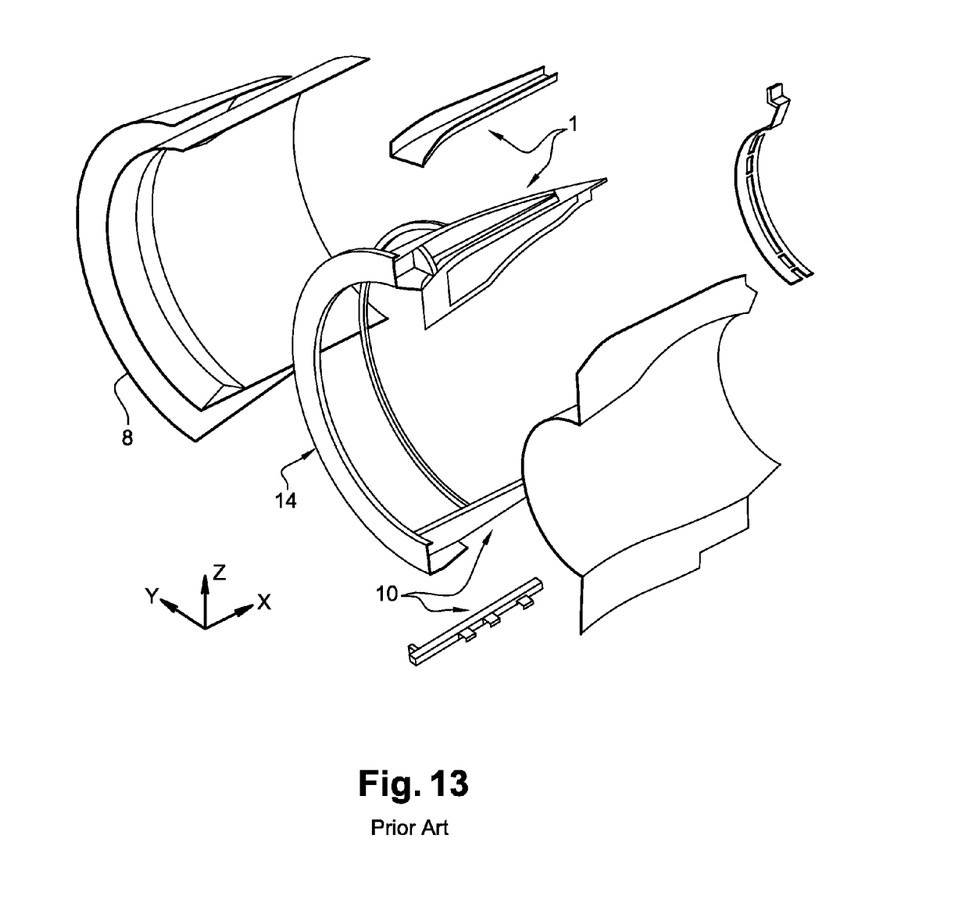
FIG. 13 is a perspective view of a thrust reverser structure according to a prior art.

Traditionally, a cascade thrust reverser 12 includes two half-cowls 8 each slidingly mounted on a supporting half-beam called 12 o'clock beam 1 pivotably mounted on a nacelle support mast 2 as illustrated in FIGS. 11-13.

A lower support beam called 6 o'clock beam 10 may also exist, including two half-beams generally each equipped with connecting means between one another and locking means for locking the two half-structures. Each 6 o'clock half-beam 10 is traditionally connected to the corresponding 12 o'clock half-beam 1 by means of an inner structure surrounding the turbojet engine 6.

The support structures or beams 1, 10 are also generally equipped with guide rails allowing a sliding movement of each half-cowl 8 on its associated half-beam alternating between a direct jet position, and a thrust reverser position called reverse jet.

The rotational movement of each half-beam on the nacelle support mast makes it possible to pivot each half-cowl relative to said mast for maintenance operations.

Figure 1:
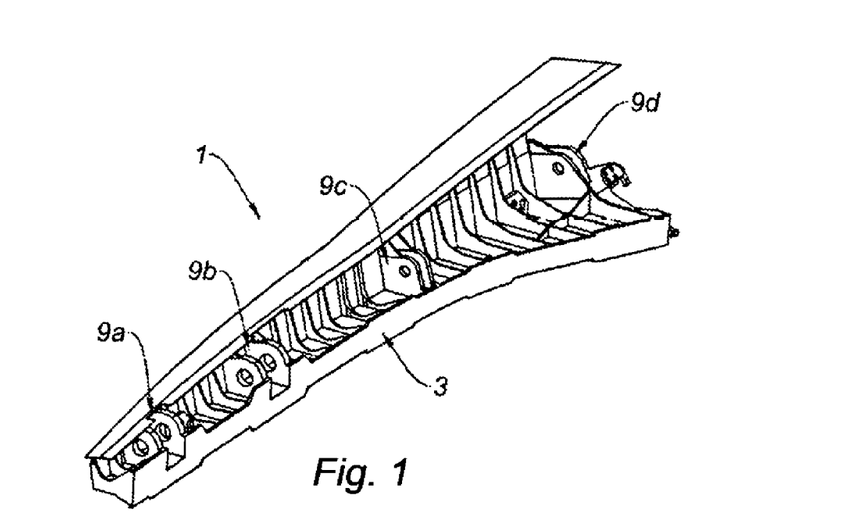
FIGS. 1 and 2 are perspective views of a metal 12 o'clock structure of the state of the art, mentioned in the preamble of this description.
Figure 2:
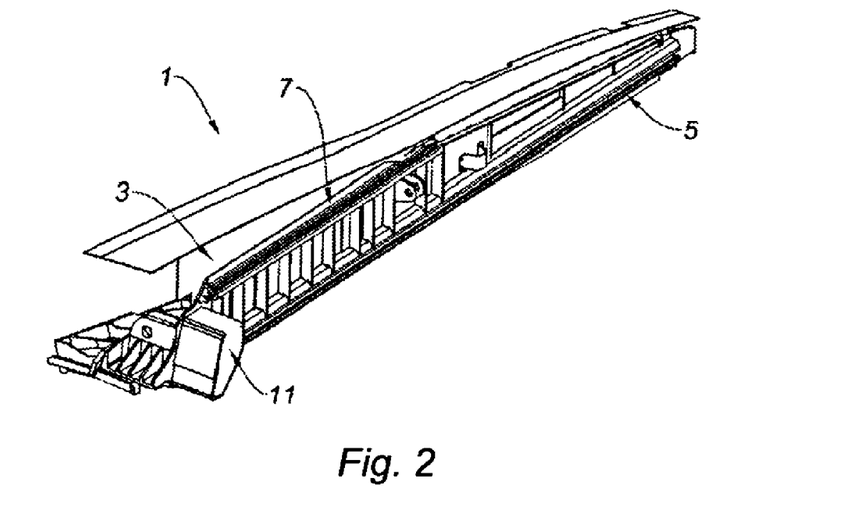

As illustrated in the appended FIGS. 1 and 2, each half-beam 1 is made from a ribbed metal alloy 3, and typically comprises, on the outer surface thereof, 25 primary 5 and secondary 7 rails capable of allowing the movement of the associated half-cowl 8, and a plurality of hinge yokes 9a, 9b, 9c, 9d capable of allowing the half-beam 1 to be hinged on the associated nacelle mast 2.

A receptacle 11, mounted on the upstream portion (relative to the direction of airflow in the nacelle 4) of the half-beam 1, makes it possible to fasten the front frame 14 intended to support the thrust reverser cascades 12.

Figure 3:
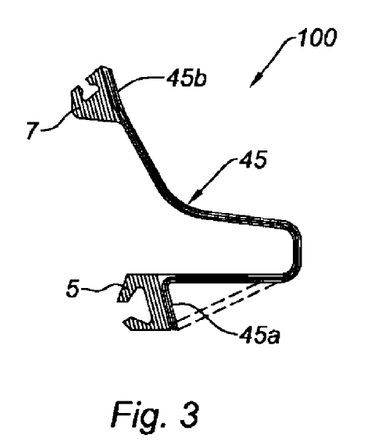
FIGS. 3 and 4 are views of a first general embodiment of a supporting structure respectively in standard section and in a hinge yoke zone.

As shown in FIG. 3, the half-beam 1 is attached by riveting 13 on the upper portion 15 of an inner fixed half-structure panel 17, generally made from a composite material, and defining, with the associated thrust reverser cowl, a tunnel for the circulation of a secondary flow of the turbojet engine.

The assembly formed by the half-beam 1, its rails 5, 7 and its hinge yokes 9a to 9d, is often designated as "12 o'clock structure," given its position at the top of the circle defined by a nacelle section, and in comparison with the dial of a clock.

The 6 o'clock beams 10 have substantially the same structure, with the exception that they do not include hinge yokes, but locking yokes and/or corresponding locking means.

In order to lighten the half-beams and reduce the production costs thereof, it has been considered to use known composite materials to allow a significant decrease in the mass while meeting the mechanical and structural strength requirements.

Document WO 2007/147193 discloses such a supporting and guiding structure capable of supporting a thrust reverser half-cowl, said beam including the base structure made up of a hollow profile having an essentially closed transverse section and made from a composite material.

The presence of an essentially closed structure makes it possible to ensure the mechanical strength of the beam.

However, there is a need to lighten aeronautical structures.

BRIEF SUMMARY

The present invention aims to propose an even lighter supporting structure, and to that end, comprises of a supporting structure for a turbojet engine nacelle, in particular equipped with a thrust reverser device, including at least one base body made from a composite material, characterized in that the base body has an essentially open transverse section equipped with at least one reinforcement means.

In fact, it has surprisingly been observed that the necessary rigidity could be obtained not only by providing an essentially closed section, but an open section also making it possible, in particular associated with a corresponding reinforcement means, to meet this requirement even while using composite materials.

The total mass of the structure is therefore greatly decreased.

Such a beam structure also allows a significant reduction in production costs, since an open section makes it possible to use a simple mold not requiring the placement of an inner core, or its extraction after molding.

Furthermore, an open structure allows better accessibility for the installation of components on the finished piece, and in particular the hinge pins, or for quality or strength checks of the produced parts during use, or during repair operations.

It will also be noted that an open section allows great freedom in the shape of the beam. In fact, in the case of a gradual reduction in section, for example, such a reduction in section in particular allowing the beam to be better adapted to the inner aerodynamic lines and allowing better integration of the fairing piece inside the circulation tunnel for the secondary flow, a closed section will require the use of soluble mold cores.

Preferably, the base body is made using a resin infusion molding method, and more particularly by resin transfer molding (RTM).

Advantageously, the structure includes at least one guide means, in particular of the rail type, made from carbon, metal, or a metal alloy, in particular, for slidingly mounting a movable cowl of the thrust reverser device. Such a rail is adapted to the case of a cascade thrust reverser. The rails could be attached, in particular by gluing, riveting, and other fastening methods, on the structure or integrated into the composite material used to make the assembly in a single piece.

Advantageously, said support structure is connected to part of a panel of an inner fixed fairing structure of a turbojet engine.

According to a first alternative, the panel of the inner fixed structure is attached, in particular by gluing, riveting, or any other fastening method, on the support structure. Advantageously, the panel of the inner fixed structure is attached so as to close the open section of the base body. The closed section thus re-created increases the strength of the assembly.

According to a second alternative, the panel of the inner fixed structure is integrated into the supporting structure. The inner structure may in particular be integrated into the draping of the structure or by making the inner structure from a composite material and in a single piece with the supporting structure.

The integration of the inner fixed structure (generally designated as IFS) makes it possible to avoid riveting the supporting structure to the inner structure panel, which procures mass gains on the one hand, and simplification of the assembly on the other.

Preferably, the supporting structure includes at least one yoke or fitting for fastening, preferably so as to be disassemblable and/or pivotable, to a load-bearing structure of the pylon type or another supporting structure according to the invention. The yokes and fittings could indifferently be made from a metal alloy, carbon, composite material, etc. and attached (in particular by gluing, riveting, bolting, or any other fastening method) or integrated into the supporting structure (integrated to the draping of the structure or also made from a composite material with the structure, for example).

According to a first embodiment of the invention, the structure is a 12 o'clock beam.

According to a second embodiment of the invention, the structure is a 6 o'clock beam.

Advantageously, the base body has at least one reinforcement.

Also advantageously, the base body includes a plurality of reinforcements distributed along said structure.

Preferably, at least part of the reinforcements are square shaped.

Advantageously, the reinforcements are made from a composite material. This makes it possible to integrate them into the molding of the part.

Advantageously, the reinforcements are an integral part of the supporting structure.

Advantageously, the supporting structure integrates at least one connecting portion for connecting to a front frame.

According to a first alternative, the supporting structure has at least one portion stiffened by stamping, in particular a floor wall of the structure.

Alternatively or complementarily, the supporting structure has at least one portion stiffened by corrugation, in particular a floor wall of the structure.

Also alternatively or complementarily, the supporting structure has at least one portion stiffened by wall lamination, in particular a floor wall of the structure, for example in the shape of a U.

Advantageously, the supporting structure integrates a fairing wall capable of ensuring inner aerodynamism at a secondary flow circulation tunnel.

This application also relates to an aircraft nacelle, characterized in that it comprises at least one supporting structure according to the invention.

BRIEF DESCRIPTION OF THE DRAWINGS

The present invention will be better understood in light of the following detailed description, in reference to the appended drawing, in which.

In all of these figures, identical or similar references designate identical or similar members or sets of members.

Figure 4:
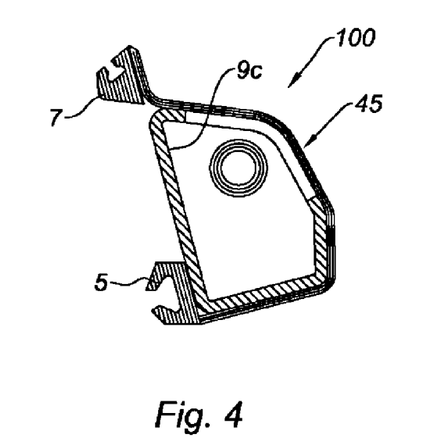
Figure 5:
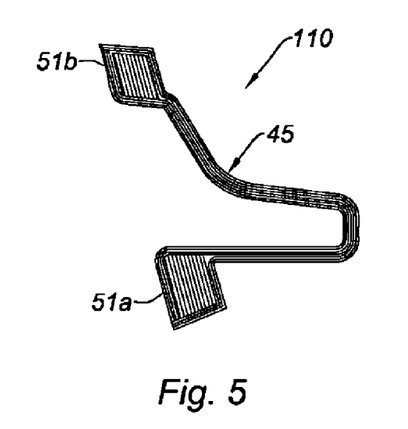
FIG. 5 is a view similar to FIG. 3 of one alternative embodiment of the invention.

FIGS. 3 to 5 show a half-beam 100 in transverse cross-section in standard section and at a hinge yoke 9c, respectively.

DETAILED DESCRIPTION

The beam 100 has a box 45 with an open section and made from a composite material, the box in this case being formed by draping several layers of composite fibers.

The open box 45 has two free ends 45a, 45b at each of which a guide rail 5, 7 is arranged. As previously mentioned, the rails 5, 7 can be made from a metal alloy or a composite material and can be fastened on the box or integrated therewith, in particular by insertion into the draping as shown in FIG. 5.

As described for FIGS. 1 and 2, the half-beam 100 includes hinge yokes 9a, 9b, 9c, 9d arranged at predefined intervals along a longitudinal axis of said half-beam 100.

FIG. 4 is a cross-sectional view at one of said yokes 9c. As for the guide rails 5 and 7, the yokes 9a, 9b, 9c, 9d can traditionally be made from a metal alloy, a composite material, or forged carbon, for example, and attached on the half-beam 100 or integrated therewith.

The half-beam 100 may be obtained by molding, in particular using a resin infusion method or by resin transfer (RTM) in a mold comprising at least one core and at least one die. These techniques are known by those skilled in the art and are not the subject-matter of the present application.

In general, and as shown on the beam 110 of FIG. 5, slugs 51a, 51b defining the rails 5 and 7 are placed on the core, and the layers of composite material making up the box 45 are draped on said slugs 51a, 51b, and on the core.

The die is then closed on the core, and resin is injected into the interface between said die and said core, thereby making it possible to assemble the various elements making up the half-beam 100 using a resin transfer method known as RTM, i.e. "resin transfer molding."

Alternatively, the box 45 can be made from at least two draping subassemblies clamping the rail slugs 51a, 51b (result FIG. 5).

This particular arrangement, which can also be obtained using an RTM method, allows a close connection of the rails 5, 7 with the open box 45, and therefore excellent strength of the assembly.

It will also be noted that the rails 5, 7 may be associated with a support plate then fastened on the half-beam. All of the alternatives for integrating and fastening rails 5, 7 known by those skilled in the art may be used in the context of the present invention.

FIGS. 6 to 10 shows several preferred embodiments of the base body of a half-beam according to the invention including a base body equipped with at least one reinforcement means and in particular setting out several solutions to increase the strength of a composite beam with an open section according to the invention.

Figure 6:
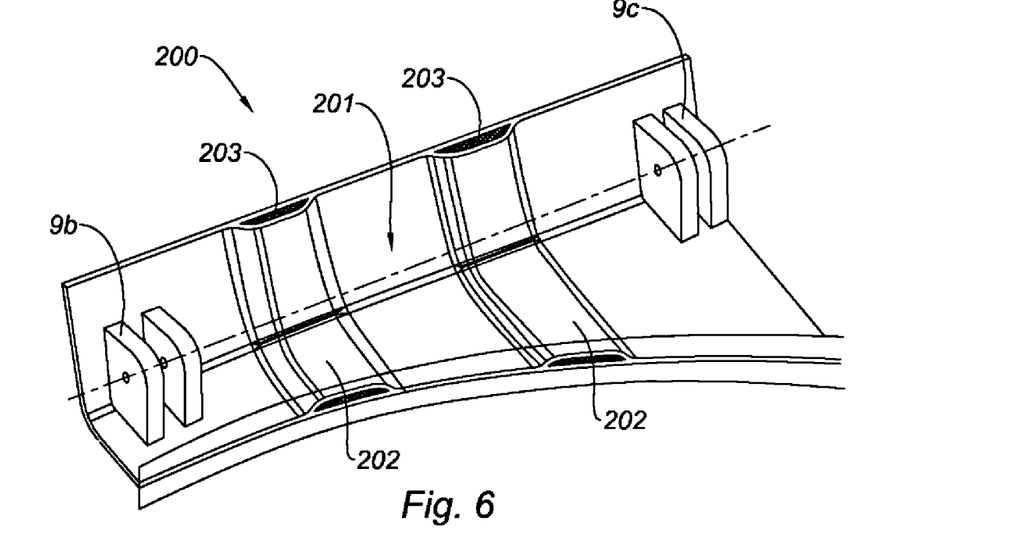
FIG. 6 is a partial view of a first preferred embodiment of a supporting structure according to the invention.

FIG. 6 shows a beam 200 made from a composite material having, according to the invention, a base body 201 with an open section, and more particularly an L-shaped section.

The beam 200 has a plurality of square-shaped reinforcements 202 discretely distributed along said beam 202. The reinforcements can be made from a metal alloy or composite material, for example, and can be attached or integrated into the base body 201.

In the case at hand, the reinforcements 202 are made by integration into the draping of the beam of 200 by stamping plies. Each reinforcement 202 has a core 203 which can, in particular, be made from a composite material, foam, or other material.

Figure 7:
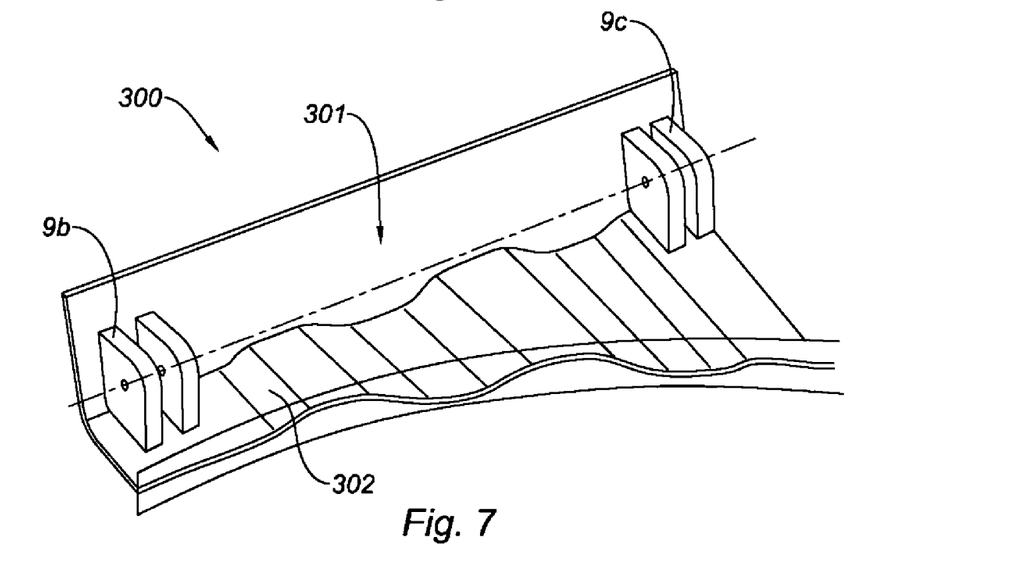
FIG. 7 is a partial view of a second preferred embodiment of a supporting structure according to the invention.

FIG. 7 shows a beam 300 having a base body 301 with a substantially L-shaped open section. The base body has a foot forming a floor wall 302 of the base body, and while being configured so as to have a corrugated surface imparting increased rigidity to the assembly.

Figure 8:
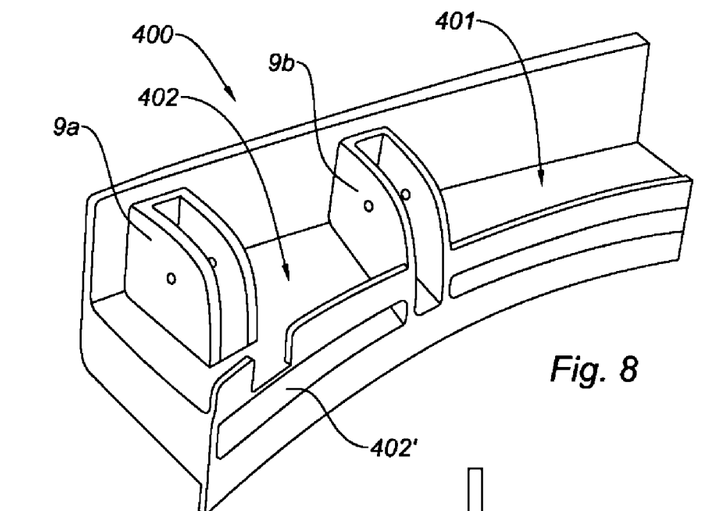
FIGS. 8 and 9 are partial and cross-sectional views, respectively, of a third preferred embodiment of the invention.

FIG. 8 shows a beam 400 having a base body 401 with a substantially L-shaped open section. The base body has a foot assuming the form of a double wall 402, 402'. According to the invention, the double floor wall 402, 402' is open, in the case at hand, laterally.

Figure 9:
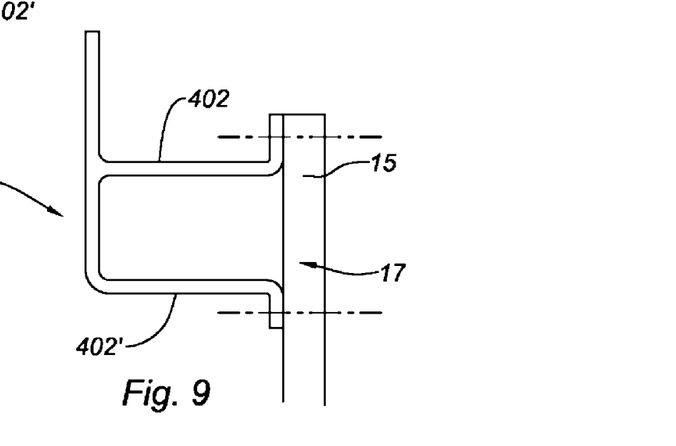

According to one advantageous aspect of the invention, and as shown in FIG. 9, a wall of an upper panel 15 of an inner fixed structure 17 closes the open double wall 402, 402'. As previously mentioned, the wall 15 of the fixed structure 17 may be attached using means known by those skilled in the art, in particular by adhesion or riveting.

Figure 10:
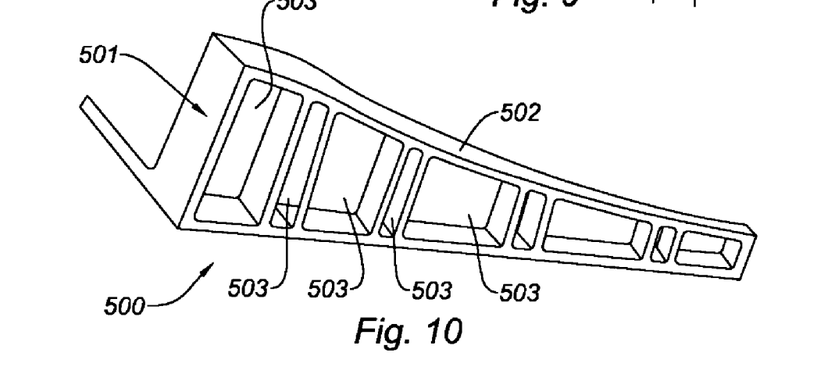
FIG. 10 is a partial view of a fourth preferred embodiment the invention.

FIG. 10 shows a beam 500 having a base body 501 with a substantially L-shaped open section. The base body has a foot 502 in the thickness of which cells 503 are formed, thereby creating an open section. The cells 503 may be covered by a fairing attached on the beam, in particular, as in the illustrated case, where the cells open into a lower surface, through a fairing aiming to ensure aerodynamism of an air circulation tunnel.

As previously mentioned, the half-beams are connected to a panel 15 of a fixed structure 17. In the event that panel does not close the section of the base body, it may be integrated into the half-beam, and potentially made from a composite material itself.

The integration may in particular be done by surrounding the composite plies of the half-beam on either side of the panel 15, and in particular of the inner structure thereof.

Although the invention has been described with one particular embodiment, it is of course in no way limited thereto and encompasses all technical equivalents of the described means as well as combinations thereof if they are within the scope of the invention. Such equivalents and combinable means may for example be found in application FR 08/00264.

The invention claimed is:

1. An aircraft nacelle comprising: a thrust reverser device comprising at least one movable cowl; a supporting structure configured to support the thrust reverser device, the supporting structure comprising: at least one base body extending along a longitudinal direction of the nacelle and made from a composite material, wherein open walls of the base body form an open L-shaped bending section such that the entire base body in the form of the open L-shaped bending section provides access to an inner surface of the supporting structure from outside of the supporting structure, and a plurality of reinforcements attached on the inner surface of the supporting structure and distributed along the longitudinal direction, the reinforcements comprising a plurality of cores and plies draping the cores, wherein the cores and the plies are integrated with at least one open wall of the base body and form a portion of the open L-shaped bending section.

2. The aircraft nacelle according to claim 1, wherein the base body is made using a resin infusion molding method.

3. The aircraft nacelle according to claim 1, further comprising at least one guide means of the rail type for slidingly mounting a movable cowl of the thrust reverser device.

4. The aircraft nacelle according to claim 1, wherein the supporting structure is connected to part of a panel of an inner fixed fairing structure of a turbojet engine.

5. The aircraft nacelle according to claim 4, wherein the panel of the inner fixed fairing structure is attached on the supporting structure.

6. The aircraft nacelle according to claim 5, wherein the panel of the inner fixed fairing structure is attached so as to close the open L-shaped bending section.

7. The aircraft nacelle according to claim 4, wherein the panel of the inner fixed fairing structure is integrated into the supporting structure.

8. The aircraft nacelle according to claim 1, further comprising at least one yoke or fitting for fastening to a load-bearing structure of the pylon type or another supporting structure.

9. The aircraft nacelle according to claim 8, wherein the supporting structure is a 12 o'clock beam.

10. The aircraft nacelle according to claim 8, wherein the supporting structure is a 6 o'clock beam.

11. The aircraft nacelle according to claim 1, wherein the supporting structure integrates at least one connecting portion for connecting to a front frame.

12. The aircraft nacelle according to claim 1, wherein the supporting structure integrates a fairing wall and forms inner aerodynamic lines with the faring wall inside a secondary flow circulation tunnel.

* * * * *